United States Patent
Yamamoto et al.

(10) Patent No.: US 7,812,861 B2
(45) Date of Patent: Oct. 12, 2010

(54) IMAGING DEVICE CONTROLLER AND DIGITAL CAMERA

(75) Inventors: Yasuhiro Yamamoto, Tokyo (JP); Hirokazu Maeda, Saitama (JP)

(73) Assignee: Hoya Corporation, Tokyo (JP)

( * ) Notice: Subject to any disclaimer, the term of this patent is extended or adjusted under 35 U.S.C. 154(b) by 769 days.

(21) Appl. No.: 11/676,520

(22) Filed: Feb. 20, 2007

(65) Prior Publication Data
US 2007/0196083 A1 Aug. 23, 2007

(30) Foreign Application Priority Data
Feb. 21, 2006 (JP) .............................. 2006-043496

(51) Int. Cl.
*H04N 5/228* (2006.01)
(52) U.S. Cl. .............................. 348/222.1; 348/333.13; 348/240.99; 348/208.99; 348/345
(58) Field of Classification Search ............. 348/333.13
See application file for complete search history.

(56) References Cited

U.S. PATENT DOCUMENTS

| | | | |
|---|---|---|---|
| 2002/0163581 A1* | 11/2002 | Kitazawa et al. | 348/208.6 |
| 2002/0171755 A1* | 11/2002 | Nishimura | 348/372 |
| 2003/0063211 A1* | 4/2003 | Watanabe et al. | 348/345 |
| 2003/0146981 A1* | 8/2003 | Bean et al. | 348/222.1 |
| 2005/0088568 A1 | 4/2005 | Uenaka | |
| 2005/0089322 A1 | 4/2005 | Uenaka | |
| 2005/0134724 A1 | 6/2005 | Uenaka | |
| 2006/0007238 A1 | 1/2006 | Yamamoto | |

FOREIGN PATENT DOCUMENTS

JP  7-226876  8/1995

OTHER PUBLICATIONS

English Language Abstract of JP 7-226876, filed Aug. 22, 1995.
U.S. Appl. No. 11/676,543 to Yamamoto et al., filed Feb. 20, 2007.
U.S. Appl. No. 11/677,222 to Maeda, filed Feb. 21, 2007.

* cited by examiner

*Primary Examiner*—Sinh Tran
*Assistant Examiner*—Paul Berardesca
(74) *Attorney, Agent, or Firm*—Greenblum & Bernstein, P.L.C.

(57) ABSTRACT

An imaging device controller that controls an imaging device, comprising a detector and a driver, is provided. The imaging device is mounted in an image capturing apparatus. The image capturing apparatus has plural functions. The detector detects that the first function among the functions is carried out. The driver orders the imaging device to capture an optical image in a first interval before or after a detection period. The detector is detecting that the first function is carried out during the detection period. The driver orders the imaging device to capture an optical image in a second interval during the detected-period. The second interval is longer than the first interval.

10 Claims, 2 Drawing Sheets

IMAGING DEVICE CONTROLLER AND DIGITAL CAMERA

The present disclosure relates to subject matter contained in Japanese Patent Application No. 2006-043496 (filed on Feb. 21, 2006), which is expressly incorporated herein, by reference, in its entirety.

BACKGROUND OF THE INVENTION

1. Field of the Invention

The present invention relates to an imaging device controller that controls the operations of an imaging device mounted in a photographing machine, such as a digital camera.

2. Description of the Related Art

A digital camera generates and stores electronic data corresponding to an optical image by capturing an object. Power is consumed to generate and store the electronic data. In addition, a digital camera may have various additional functions, and power is consumed in the process of carrying out such functions.

Power used for the above operations of the digital camera is supplied by a battery, such as a storage battery. The capacity of a battery which can be re-charged is limited. Accordingly, when power charged in the battery is completely spent, the various functions of the digital camera, including photographing, cannot be carried out.

SUMMARY OF THE INVENTION

Therefore, an object of the present invention is to provide an imaging device controller and a digital camera that mitigates the power consumption.

According to the present invention, an imaging device controller that controls an imaging device, comprising a detector and a driver, is provided. The imaging device is mounted in an image capturing apparatus. The image capturing apparatus has plural functions. The detector detects that the first function is carried out. The first function is predetermined among the plural functions. The driver orders the imaging device to capture an optical image of an object in a first interval before or after a detection period. The detector detects that the first function is carried out during the detection period. The driver orders the imaging device to capture an optical image of an object in a second interval during the detection period. The second interval is longer than the first interval.

BRIEF DESCRIPTION OF THE DRAWINGS

The objects and advantages of the present invention will be better understood from the following description, with reference to the accompanying drawings in which:

FIG. 2 is a flowchart describing the process carried out by the CPU and the AFE when the function for power conservation is switched on.

DESCRIPTION OF THE PREFERRED EMBODIMENTS

Figure 1:
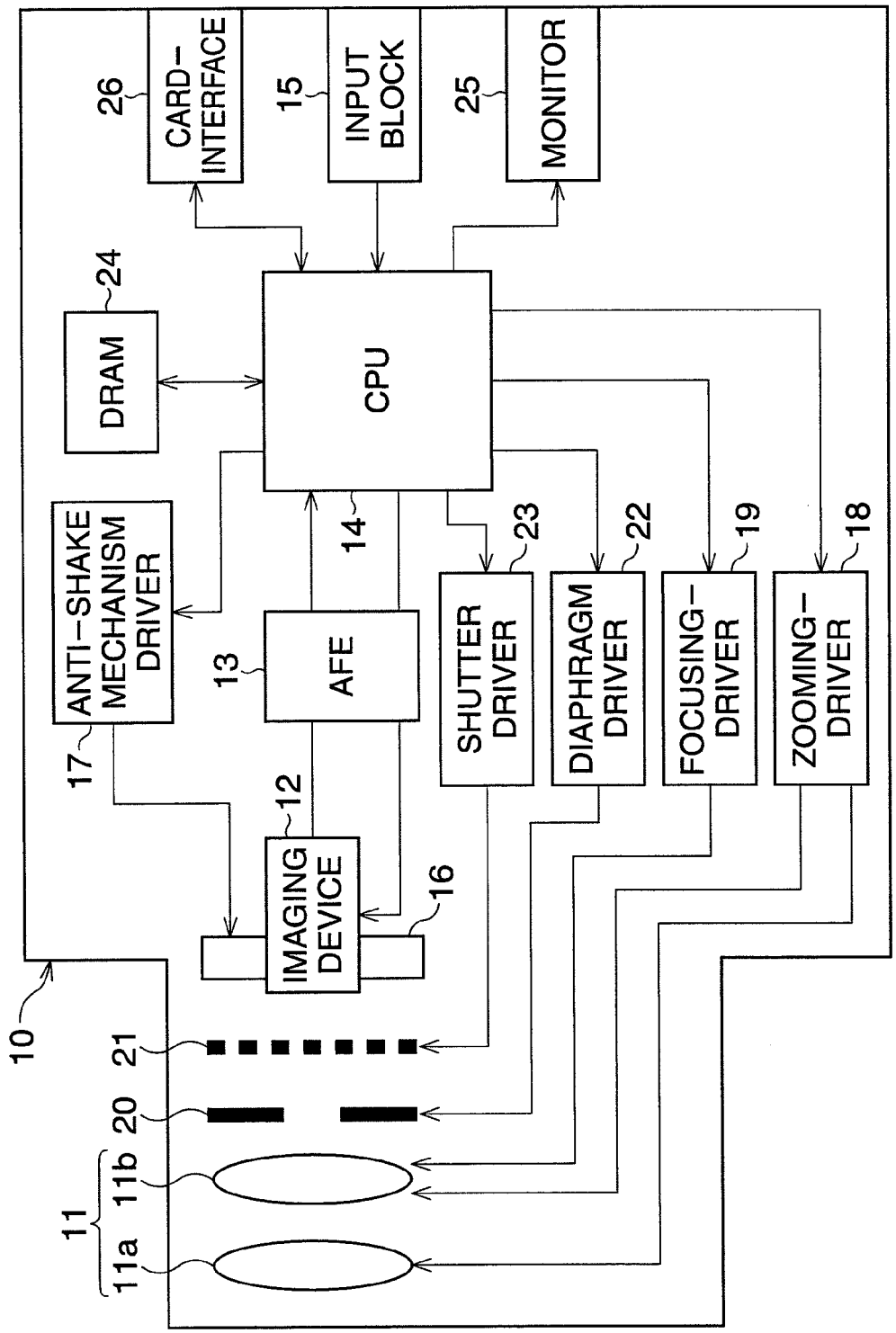
FIG. 1 is a block diagram showing the internal structure of a digital camera having an imaging device controller of an embodiment of the present invention.

The present invention is described below with reference to the embodiment shown in the drawings.

In FIG. 1, a digital camera 10 comprises a photographic optical system 11, an imaging device 12, an analog front end (AFE) 13, a CPU 14, an input block 15, an anti-shake mechanism 16, an anti-shake mechanism driver 17, a zooming-driver 18, a focusing-driver 19, and other components.

The photographic optical system 11 is optically connected to the imaging device 12. An optical image of an object through the photographic optical system 11 is incident to the light-receiving surface of the imaging device 12. The imaging device 12 is, for example, a CCD area sensor. When the imaging device 12 captures the optical image of the object at the light-receiving surface, the imaging device 12 generates an image signal corresponding to the captured optical image.

The photographic optical system 11 comprises plural lenses, including a zoom lens 11a and a focus lens 11b. The zoom lens 11a and the focus lens 11b are movable along an optical axis of the photographic optical system 11. The zoom lens 11a and the focus lens 11b form a zoom optical system. The focal length of the photographic optical system 11 is adjusted by moving the zoom lens 11a and the focus lens 11b in relationship to each other. Further, an optical image of an object can be focused on the light-receiving surface of the imaging device 12 by moving the focus lens 11b.

The movement of the zoom lens 11a and the focus lens 11b for adjusting the focal length of the photographic optical system 11 is carried out by the zooming driver 18. The movement of the focus lens 11b for focusing is carried out by the focusing-driver 19.

A diaphragm 20 and a shutter 21 are mounted between the photographic optical system 11 and the imaging device 12. The intensity of light, made incident on the light-receiving surface of the imaging device 12, is adjusted by adjusting the aperture ratio of the diaphragm 20. A diaphragm driver 22 drives the diaphragm 20 so that the aperture ratio can be adjusted. An optical image reaches the light-receiving surface by opening the shutter 21, and an optical image is shielded from the light-receiving surface by closing the shutter 21. A shutter driver 23 drives the shutter 21 so that the shutter can open and close.

The imaging device 12 is supported by an anti-shake mechanism 16. The anti-shake mechanism is formed by a base block (not depicted) and a movable block (not depicted). The base block is fixed to a camera body. The movable block holds the imaging device.

The movable block is mounted on the base block and the movable block is movable on a plane perpendicular to the optical axis of the photographic optical system 11. Accordingly, the imaging device 12 is also movable on the plane perpendicular to the optical axis of the photographic optical system 11. The movable block moves on the plane perpendicular to the optical axis of the photographic optical system 11 by control of the anti-shake mechanism driver 17 that drives the anti-shake mechanism 16.

The anti-shake mechanism driver 17 comprises a shake-sensor (not depicted). The shake-sensor detects the direction and length of a shake of the digital camera 10. The anti-shake mechanism driver 17 drives the movable block to move in the opposite direction of the detected shake direction for the same length as the detected shake length.

A relative location where an optical image of an object is in focus on the light-receiving surface is shifted according to a user's hand shake. The influence of such a shift is canceled by moving the imaging device 12 via the movable block.

Incidentally, the zooming-driver 18, the focusing-driver 19, the diaphragm 22, the shutter driver 23, and the anti-shake mechanism driver 17 are all connected to the CPU 14. The CPU 14 controls the operations of the zooming-driver 18, the focusing-driver 19, the diaphragm 22, the shutter driver 23, and the anti-shake mechanism driver 17.

The imaging device 12 is electrically connected to the CPU 14 via the AFE 13. A clock signal is sent from the CPU 14 to the AFE 13. The AFE 13 generates a frame signal and an imaging device driving signal based on the received clock signal. The imaging device driving signal is sent to the imaging device 12. The imaging device 12 is driven based on the imaging device driving signal to generate an image signal corresponding to the frame signal.

The generated image signal is sent to the AFE 13. The AFE 13 carries out correlated double sampling and gain adjustment on the image signal. In addition, the image signal is converted into image data, which is digital data. The image data is sent to the CPU 14.

The CPU 14 is connected to a dynamic random access memory (DRAM) 24. The DRAM is used as a work memory for signal processing carried out by the CPU 14. The image data sent to the CPU 14 is temporarily stored in the DRAM 24. The CPU 14 carries out predetermined signal processing for the image data stored in the DRAM 24.

The CPU 14 is connected to a monitor 25. The image data, having undergone predetermined signal processing, is sent to the monitor 25, which is able to display an image corresponding to the received image data.

The CPU 14 is connected to a card-interface 26 which can be connected to a memory card (not depicted). When a release operation, as described later, is carried out, the image data, having undergone predetermined signal processing, is stored in the memory card.

The CPU 14 is connected to the input block 15, where a user inputs operational commands. The input block 15 comprises a power button (not depicted), a zoom button (not depicted), a release button (not depicted), and other buttons. The CPU 14 orders each component of the digital camera 10 to carry out a necessary operation according to a user's command input to the input block 15, as described below.

By pushing on the power button, power of the digital camera 10 is switched on and off. When power of the digital camera 10 is switched on, each component of the digital camera 10 starts.

For example, when power is switched on, the digital camera 10 starts the predetermined operations for a stand-by mode. In the stand-by mode, the imaging device 12 is driven and the capture of an optical image is initiated. Further, as described later, the object captured by the imaging device 12 is displayed on the monitor 25.

Further for example, when power is switched on, the zooming-driver 18 and the focusing-driver 19 move the zoom lens 11a and the focus lens 11b to predetermined lens starting positions. Incidentally, the zoom lens 11a and the focus lens 11b are located and stored in predetermined storage positions while power is switched off.

Further for example, when power is switched on, the anti-shake mechanism driver moves the movable block so that the imaging device 12 moves to a predetermined imaging device starting position. Incidentally, the imaging device starting position is the intersection point of the light-receiving surface and the optical axis of the photographic optical system 11. The imaging device 12 is moved so that a central point of the light-receiving surface can agree with the imaging device starting position. Incidentally, the imaging device 12 is located at a predetermined storage position.

By continuously pushing on the zoom button, zooming-operation is carried out. In the zooming-operation, the zooming-driver 18 moves the zoom lens 11a and the focus lens 11b along the optical axis of the photographic optical system 11. As described above, by moving the zoom lens 11a and the focus lens 11b in relationship to each other along the optical axis, the focal length of the photographic optical system 11 is adjusted.

By depressing on the release button halfway during stand-by mode, exposure adjustment and focusing operation are carried out. In the exposure adjustment, adjustment of the aperture ratio of the diaphragm 20, adjustment of shutter speed, and gain adjustment for the image signal are carried out. In the focusing operation, the location of the focus lens 11b is adjusted. Further, by fully depressing the release button, the release operations, such as opening and closing the shutter 21, capturing by the imaging device 12, and storing the image data in the memory card, are carried out.

Next, control of the operations carried out by the CPU 14 during stand-by mode is explained below. In stand-by mode, a thru-image is displayed on the monitor 25. Incidentally, the thru-image is a real-time optical image of an object captured by the imaging device 12.

During stand-by mode, a clock signal, of which frequency is 36 MHz, is sent from the CPU 14 to the AFE 13. When the AFE 13 receives the 36 MHz clock signal, the AFE 13 generates a frame signal, of which frequency is 30 Hz, and a driving signal corresponding to the frame signal of which frequency is 30 Hz. The generated driving signal is sent to the imaging device 12. Incidentally, in stand-by mode the CPU 14 controls the shutter driver 23 so that the shutter 21 is left open.

The imaging device 12 starts to capture an optical image of an object based on the driving signal, and then one frame of an image signal is generated. Incidentally, the frequency of the frame signal is the same as the frequency of the image signal. Consequently, one frame of an image signal is generated per 1/30 second.

The generated image signal is sent to the CPU 14 via the AFE 13, as described above. The CPU 14 sends the image data to the monitor 25 after carrying out the predetermined signal processing for the received image signal. Accordingly, an image successively updated per 1/30 second is displayed as the thru-image on the monitor 25.

The digital camera 10 has a function for power saving. When the function for power saving is switched off, the CPU 14 controls the AFE 13 as described above in stand-by mode. When the function for power saving is switched on, the CPU 14 carries out another control for the AFE 13.

As described above, a thru-image, based on an optical image captured per 1/30 second, is displayed on the monitor 25 in stand-by mode. On the other hand, when the function for power saving is switched on, a thru-image, based on an optical image captured per 1/15 second is displayed on the monitor 25 while the focal length of the photographic optical system 11 is adjusted by the zooming-driver 18, the zoom lens 11a and the focus lens 11b are moved to the lens starting position, or the imaging device 12 is moved to the imaging device starting position.

Incidentally, the movements of the zoom lens 11a and the focus lens 11b by the zooming-driver 18, the movements of the zoom lens 11a and the focus lens 11b to the lens starting position, and the movement of the imaging device 12 to the imaging device starting position are detected by the CPU 14. For example, the movements of the zoom lens 11a and the focus lens 11b by the zooming-driver 18 is detected by the CPU 14 based on a command input to the zoom button. The movements of the zoom lens 11a and the focus lens 11b to the lens starting position is detected when the power is switched on and each component of the digital camera 10 is ordered to start.

When the CPU 14 detects these movements, a clock signal, of which frequency is 18 MHz, is sent from the CPU 14 to the AFE 13. When the AFE 13 receives the 18 MHz clock signal, the AFE 13 generates a frame signal, of which frequency is 15 Hz, and a driving signal corresponding to the frame signal of which frequency is also 15 Hz. The generated driving signal is sent to the imaging device 12. Accordingly, the imaging device 12 then captures an optical image of an object per 1/15 second, which is half the frequency of the stand-by mode.

After the zooming-driver 18 moves the zoom lens 11a and the focus lens 11b, the zoom lens 11a and the focus lens 11b moves to their respective starting positions, and the imaging device 12 moves to the imaging device starting position, the frequency of the clock signal is reset to 36 MHz. Accordingly, the imaging device 12 then captures an optical image of an object per 1/30 second.

Figure 2:
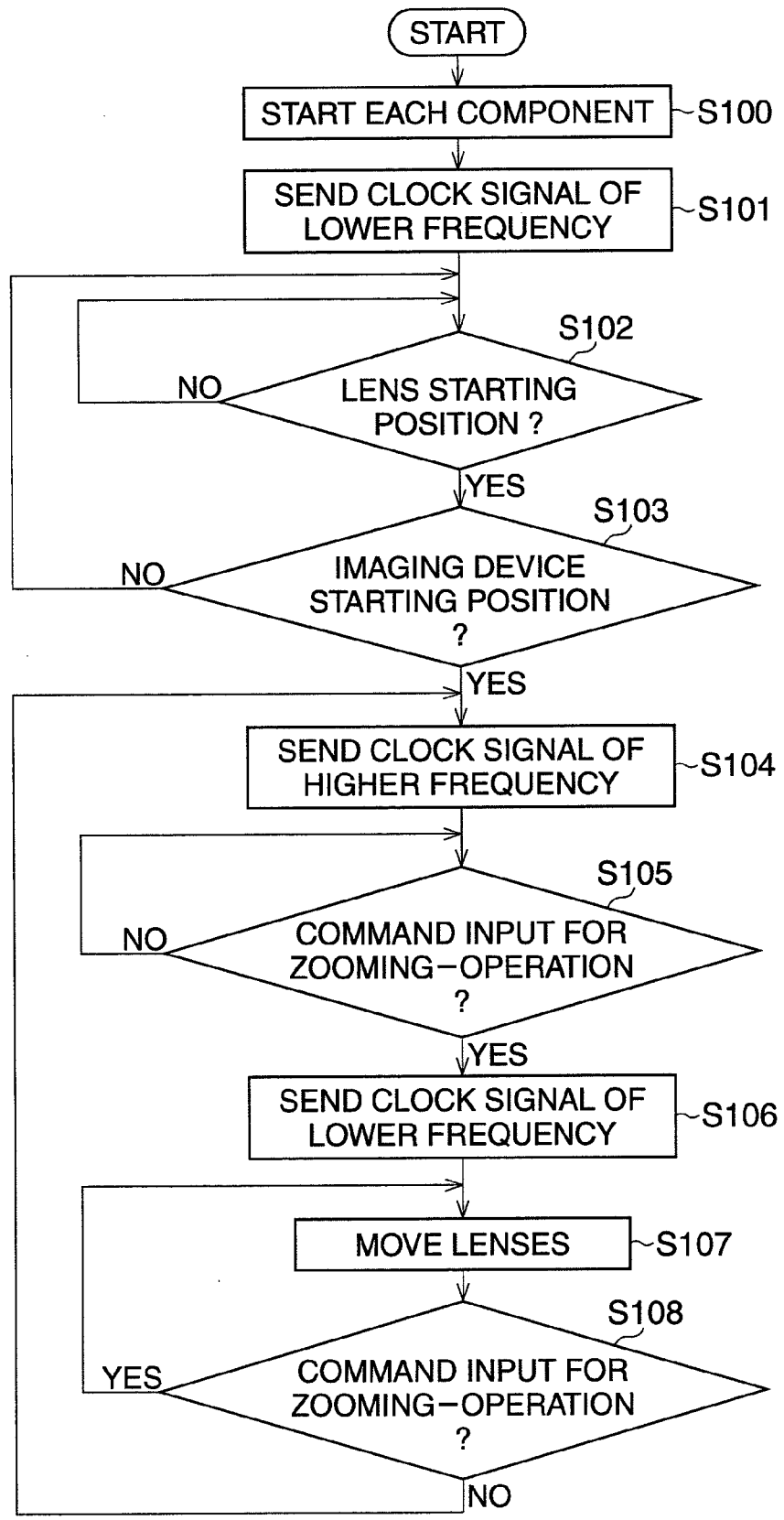

Next, the process that the CPU 14 and the AFE 13 carry out when the function for power conservation is selected is explained below, using the flowchart of FIG. 2.

The process starts when power of the digital camera 10 is switched on. Incidentally, the process is repeated until power of the digital camera 10 is switched off.

At step S100, each component of the digital camera 10 is ordered to start. For example, the movements of the zoom lens 11a and the focus lens 11b to the lens starting position and the movement of the imaging device 12 to the imaging device starting position are initiated, as described above.

At step S101, the AFE 13 sends the driving signal to the imaging device 12, at which point the imaging device 12 commences to be driven. Incidentally, the imaging device 12 may commence to be driven simultaneously with the movements of the lenses 11a and 11b and the imaging device 12 to their respective starting positions.

In addition at step S101, a clock signal, of which frequency is 18 MHz, is sent from the CPU 14 to the AFE 13. Upon receipt of the lower frequency clock signal, the AFE 13 sends a driving signal corresponding to a frame signal of 15 Hz to the imaging device 12. The imaging device 12 generates an image signal per 1/15 second in synchronicity with the frame signal of 15 Hz. The predetermined signal processing is carried out for the generated image signal, and the image data based on the image signal is sent to the monitor 25.

After the imaging device 12 has commenced to be driven, the process proceeds to step S102. At step S102, it is determined whether the zoom lens 11a and focus lens 11b have reached their respective starting positions.

When it is determined that the zoom lens 11a and the focus lens 11b have not reached their respective starting positions, the process returns to step S102 and step S102 is repeated until both lenses 11a and 11b reach their respective starting positions. Once both lenses 11a and 11b have reached their respective starting positions, the process proceeds to step S103.

At step S103, it is determined whether or not the imaging device 12 has reached the imaging device starting position in the anti-shake mechanism 16. When it is determined that the imaging device 12 has not reached the imaging device starting position, the process returns to step S102 and steps S102 and S103 are repeated until the imaging device 12 reaches the imaging device starting position. Once the imaging device 12 has reached the imaging device starting position, the process proceeds to step S104.

At step S104, the frequency of the clock signal sent from the CPU 14 to the AFE 13 is changed to 36 MHz. Upon receipt of the higher frequency clock signal, the AFE 13 sends a driving signal corresponding to a frame signal of 30 Hz to the imaging device 12. The imaging device 12 generates an image signal per 1/30 second in synchronicity with the frame signal of 30 Hz. The predetermined signal processing is carried out for the generated image signal, and the image data based on the image signal is sent to the monitor 25.

At step S105, it is determined whether or not the user has input a command for zooming-operation. When the command input for zooming-operation is not detected, the process returns to step S105 and the step S105 is repeated until the command input is detected. When the input command is detected, the process proceeds to step S106.

At step S106, the frequency of the clock signal sent from the CPU 14 to the AFE 13 is changed to 18 MHz. Upon receipt of the lower frequency clock signal, the AFE sends a driving signal corresponding to a frame signal of 15 Hz to the imaging device 12. The imaging device 12 generates an image signal per 1/15 second in synchronicity with the frame signal of 15 Hz. The predetermined signal processing is carried out for the generated image signal, and the image data based on the image signal is sent to the monitor 25.

At step S107, the zooming-driver 18 begins driving the zoom lens 11a and focus lens 11b, thus adjusting the focal length of the photographic optical system 11. At step S108, it is determined whether or not the input command for zooming-operation is still detected. When the input command is still detected, the process returns to step S107 and steps S107 and S108 are repeated until the input command is no longer detected. Once detection of the input command has ceased, the process returns to step S104 and steps S104-S108 are repeated.

In the above embodiment, when a predetermined function is carried out, the frequency of the frame signal is lowered and the interval of capturing an optical image is expanded. Accordingly, as the frequency for capturing an optical image is lowered, less power is consumed by the entire digital camera 10 and more power is conserved.

The frequency of capturing an optical image is lowered so that motion resolution may be lowered. However, it is not necessary in general to keep motion resolution at a high level when the zooming-driver 18 is operated to move the zoom lens 11a and focus lens 11b, when the zoom lens 11a and focus lens 11b are moved to their respective starting positions, and when the imaging device 12 is moved to the imaging device starting position. Accordingly, utility of the digital camera 10 is maintained in such operations for moving lenses 11a and 11b or the imaging device 12, even if an interval of capturing an optical image is expanded.

In addition, the expanded interval of capturing an optical image is changed back to a shorter interval once the predetermined function has been carried out. Accordingly, utility of the digital camera 10 is maintained.

Further, the above described operations for power conservation can be suspended by switching off the power conservation function. Accordingly, even if a user desires to see the thru-image during a zooming-operation, utility of the digital camera 10 is prevented from lowering by automatically switching off the power conservation function.

The frequency of the frame signal is changed from a higher to lower level when the lenses 11a and 11b are moved for zooming-operations, when the lenses 11a and 11b are moved to the lens starting position, and when the imaging device 12 is moved to the imaging device starting position, in the above embodiment. However, the frequency may also be changed while other functions, not requiring high motion resolution, are carried out. For example, a function in which a user carries out without viewing the thru-image, or a function the user carries out without requiring synchronization of the changing frame signal.

The zoom lens 11a and the focus lens 11b start to be moved for focal length adjustment, after lowering a frequency of the frame signal, in the above embodiment. However, the frequency of the frame signal may be reduced once the zoom lens 11a and focus lens 11b commence movement for focal length adjustment. Of course, it is preferable for power consumption purposes to lower the frequency in advance of the movement of lenses 11a and 11b.

The lenses 11a and 11b, and the imaging device 12 move to the lens starting position and the imaging device starting position, respectively, as soon as power of the digital camera 10 is switched on, in the above embodiment. These movements may be carried out based on an input command in stand-by mode, and the frequency of the frame signal may be lowered when the CPU 14 detects such an input command.

The anti-shake mechanism 16 supports the imaging device 12 in the above embodiment. However, the anti-shake mechanism may support an anti-shake lens in the photographic optical system 11. The influence of a shift according to user's hand shake can also be canceled by moving the lens for an anti-shake.

The imaging device 12, which receives the frame signal, generates one frame of the image signal in the above embodiment. However, the same effect of the above embodiment can be achieved if the imaging device generates one field of the image signal.

The frequency of the frame signal is changed to either 30 Hz or 15 Hz in the above embodiment. However, it is not limited to either 30 Hz or 15 Hz. The same effect of the above embodiment can be achieved if the frequency of the frame signal chosen for the function for power conservation is lower than the frequency of the frame signal in the stand-by mode.

Although the embodiments of the present invention have been described herein with reference to the accompanying drawings, obviously many modifications and changes may be made by those skilled in this art without departing from the scope of the invention.

The invention claimed is:

1. An imaging device controller that controls an imaging device, said imaging device being mounted in an image capturing apparatus, said image capturing apparatus having plural functions, said plural functions comprising at least one of moving at least one of plural lenses along an optical axis of a photographic optical system to change a focal length of said photographic optical system, moving a focus lens to a predetermined starting position, and moving an anti-shake mechanism to a predetermined starting position, said imaging device controller comprising:
   a detector that detects if said at least one of said plural functions is being carried out; and
   a driver that orders said imaging device to capture an optical image of an object at a second frequency if said detector detects that said at least one of said plural functions is being carried out, and said driver ordering said imaging device to capture an optical image of an object at a first frequency if said detector detects that none of said plural functions are being carried out, said second frequency being lower than said first frequency.

2. An imaging device controller according to claim 1, wherein said focus lens focuses an optical image of the object on a light receiving surface of said imaging device.

3. An imaging device controller according to claim 1, wherein said anti-shake mechanism cancels a shift of a relative location where an optical image of the object is incident on a light receiving surface of said imaging device.

4. An imaging device controller according to claim 1, wherein said driver orders said imaging device to capture an optical image of the object at said first frequency if said detector detects that said at least one of said plural functions is being carried out upon detection of an input of a command for suspending the change of a frequency of capturing an optical image of the object.

5. A digital camera having plural functions, the digital camera comprising:
   an imaging device that captured an optical image of an object;
   a detector that detects if said plural functions are being carried out, wherein said plural functions comprises at least one of moving at least one of plural lenses along an optical axis of a photographic optical system to change a focal length of said photographic optical system, moving a focus lens to a predetermined starting position, and moving an anti-shake mechanism to a predetermined starting position; and
   a driver that orders said imaging device to capture an optical image of the object at a second frequency if said detector detects that said at least one of said plural functions is being carried out, and said driver ordering said imaging device to capture an optical image of an object at a first frequency if said detector detects that none of said plural functions is being carried out, said second frequency being lower than said first frequency.

6. The digital camera according to claim 5, wherein said focus lens focuses an optical image of the object on a light receiving surface of said imaging device.

7. The digital camera according to claim 5, wherein said anti-shake mechanism cancels a shift of a relative location where an optical image of the object is incident on a light receiving surface of said imaging device.

8. The digital camera according to claim 5, wherein said driver orders said imaging device to capture an optical image of the object at said first frequency if said detector detects that said at least one of said plural functions is being carried out upon detection of an input of a command for suspending the change of a frequency of capturing an optical image of the object.

9. The imaging device according to claim 1, wherein said driver changes from the first frequency to the second frequency independently of a characteristic of the object.

10. The digital camera according to claim 5, wherein said driver changes from the first frequency to the second frequency independently of a characteristic of the object.

* * * * *